United States Patent
Lohman et al.

(10) Patent No.: US 6,356,889 B1
(45) Date of Patent: Mar. 12, 2002

(54) METHOD FOR DETERMINING OPTIMAL DATABASE MATERIALIZATIONS USING A QUERY OPTIMIZER

(75) Inventors: Guy Maring Lohman, San Jose, CA (US); Gary Valentin, Toronto (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/409,323

(22) Filed: Sep. 30, 1999

(30) Foreign Application Priority Data

Sep. 30, 1998 (CA) .............................................. 2249096

(51) Int. Cl.[7] .............................................. G06F 17/30
(52) U.S. Cl. .............................. 707/2; 707/4; 707/10; 707/200; 709/104; 709/106
(58) Field of Search .............................. 707/2, 3, 4, 9, 707/10, 100, 102, 103 R, 104.1, 200–204; 709/104, 106

(56) References Cited

U.S. PATENT DOCUMENTS

| | | | |
|---|---|---|---|
| 5,276,870 A | * 1/1994 | Shan et al. | 707/2 |
| 5,822,747 A | * 10/1998 | Graefe et al. | 707/2 |
| 5,822,750 A | * 10/1998 | Jou et al. | 707/2 |
| 5,864,840 A | * 1/1999 | Leung et al. | 707/2 |
| 5,864,842 A | * 1/1999 | Pederson et al. | 707/3 |
| 5,930,785 A | * 7/1999 | Lohman et al. | 707/2 |
| 6,122,644 A | * 9/2000 | Graefe et al. | 707/202 |
| 6,199,063 B1 | * 3/2001 | Colby et al. | 707/4 |
| 6,240,406 B1 | * 5/2001 | Tannen | 707/2 |

FOREIGN PATENT DOCUMENTS

EP 0 320 266 A2 * 6/1989 .......... G06F/17/30

OTHER PUBLICATIONS

Goh, Shen–Tat et al., "An Efficient Method for Execution in a Multi–User Environment", Proceedings of the Seventh International Conference on Database Systems For Advanced Applications, 2001, Apr. 18–21, 2001, pp. 312–319.*

Kuno, H. A. et al., "Material Object–Oriented Views in MultiView", Proceedings of the Fifth International Workshop on Research Issues in Data Engineering, 1995, 6–7 Mar. 1995, pp. 78–85.*

* cited by examiner

*Primary Examiner*—Hosain T. Alam
*Assistant Examiner*—Shahid Alam
(74) *Attorney, Agent, or Firm*—Ronald L. Drumheller

(57) ABSTRACT

A method for determining optimal database materializations utilizing a query optimizer in a database management system. The method takes one or more queries as inputs and using the query optimizer in the database management system generates a series of virtual materializations by materializing some subsets of the database. The virtual materializations are used to consider the relative performance benefits, i.e. cost-benefits, for the queries based on the various virtual materializations. If the query optimizer decides to use any of the materializations in its plan, then those materializations are recommended to the user, or created automatically for the user.

11 Claims, 3 Drawing Sheets

METHOD FOR DETERMINING OPTIMAL DATABASE MATERIALIZATIONS USING A QUERY OPTIMIZER

FIELD OF THE INVENTION

The present invention relates to database management systems and more particularly to a method for determining optimal database materializations utilizing a query optimizer.

BACKGROUND OF THE INVENTION

A database management system (DBMS) comprises the combination of an appropriate computer, direct access storage devices (DASD) or disk drives, and database management software. A relational database management system is a DBMS which uses relational techniques for storing and retrieving information. The relational database management system or RDBMS comprises computerized information storage and retrieval systems in which data is stored on disk drives or DASD for semi-permanent storage. The data is stored in the form of tables which comprise rows and columns. Each row or tuple has one or more columns.

The RDBMS is designed to accept commands to store, retrieve, and delete data. One widely used and well known set of commands is based on the Structured Query Language or SQL. The term query refers to a set of commands in SQL for retrieving data from the RDBMS. The definitions of SQL provide that a RDBMS should respond to a particular query with a particular set of data given a specified database content. SQL however does not specify the actual method to find the requested information in the tables on the disk drives. There are many ways in which a query can be processed and each consumes a different amount of processor and input/output access time. The method in which the query is processed, i.e. query execution plan, affects the overall time for retrieving the data. The time taken to retrieve data can be critical to the operation of the database. tt is therefore important to select a method for finding the data requested in a query which minimizes the computer and disk access time, and therefore, optimizing the cost of doing the query.

A database system user retrieves data from the database by entering requests or queries into the database. The RDBMS interprets the user's query and then determines how best to go about retrieving the requested data. In order to achieve this, the RDBMS has a component called the query optimizer. The RDBMS uses the query optimizer to analyze how to best conduct the user's query of the database with optimum speed in accessing the database being the primary factor. The query optimizer takes the query and generates a query execution plan. The query execution plan comprises a translation of the user's SQL commands in terms of the RDBMS operators. There may be several alternative query execution plans generated by the query optimizer, each specifying a set of operations to be executed by the RDBMS. The many query execution plans generated for a single query ultimately differ in their total cost of obtaining the desired data. The query optimizer then evaluates these cost estimates for each query execution plan in order to determine which plan has the lowest execution cost. In order to determine a query execution plan with the lowest execution cost, the query optimizer uses specific combinations of operations to collect and retrieve the desired data. When a query execution plan is finally selected and executed, the data requested by the user is retrieved according to that specific query execution plan however manipulated or rearranged.

In a SQL based RDBMS the query execution plan comprises a set of primitive operations or commands, e.g. JOIN; a sequence in which the retrieve operations will be executed, e.g. JOIN ORDER; a specific method for performing the operation, e.g. SORT-MERGE JOIN; or an access method to obtain records from the base relations, e.g. INDEX SCAN. In most database systems, particularly large institutional systems, a cost-based query optimizer will be utilized. A cost-based query optimizer uses estimates of I/O and CPU resource consumption in determining the most efficient query execution plan because both I/O and CPU resource consumption depend on the number of rows that need to be processed.

The performance of queries against a database may be enhanced significantly by materializing certain data that may be redundant of data already in the database. This materialized data may be organized in ways better suited to certain database operations, such as searching for specific data, for example as with indexes, or may pre-compute information likely to be asked for often, as with materialized views, for example.

Data materialization such as indexes can benefit performance of a query in one or more of the following ways. First, a materialization can be used to rapidly find data which satisfies a user-specified search criterion, for example, predicates specified in the WHERE clause of an SQL query. Second, a materialization can be used to access rows in a particular order, thereby saving sort operations to achieve that ordering for operations such as JOINS or GROUP BY or ORDER BY clauses specified by the user. Thirdly, a materialization can be used to provide a subset of a table's columns, or tables' in the case of join indexes, that are a superset of the columns requested in a user query, thereby saving the access of the data pages of the base table. Because the data pages in the base table are presumably much larger than the index pages in the index table, the cost per row is greater for the base table.

On the other hand, materialized data has additional costs which include the following: (1) update costs to keep the materialization consistent with other data that has been modified, requiring possible data access and computation to determine the new contents of the materialized data based upon what data was modified; (2) storage costs for the materialized data, which is usually redundant of the base data; (3) increased optimization time to consider the use of these materializations, as an alternative to, or in addition to, accessing the base table.

Currently, most database systems leave the determination of the appropriate materializations up to the user. However, this can be very difficult and/or time-consuming for the user. There are typically numerous possible materializations and in many possible combinations. Furthermore, the costs and benefits of each combination will, in general, be very difficult for the user to assess.

Accordingly the present invention provides a method for determining optimal database materializations using a query optimized.

BRIEF SUMMARY OF THE INVENTION

The present invention provides a method for exploiting a database query optimizer to recommend materializations, for example indexes, of a database to enhance performance. The method takes one or more queries as inputs and using the cost-based optimizer in the database management system generates a series of virtual materializations by materializing some subsets of the database. The virtual materializations are used to consider the relative performance benefits, i.e. cost-benefits, for the queries based on the various virtual materializations. If the optimizer decides to use any of the materializations in its plan, then those materializations are recommended to the user, or created automatically for the user.

A feature of the present invention is that the method is incorporated into the query optimizer, rather than as an external tool. This arrangement provides the following advantages: (1) The existing infrastructure for iterating through alternative access paths to a table, and for estimating execution costs of these alternatives, can be exploited, and do not have to be replicated in an external tool. (2) Maintenance costs decrease because the equations used to estimate costs and benefits need be maintained in only one place, i.e. in the query optimizer. (3) There is greater accuracy in cost estimation, since there is no possibility of the query optimizer and an external tool being out of synchronization. The user is also guaranteed that the query optimizer will use the recommended materialization if it is defined, since the query optimizer recommended the materialization by using its equations to pick that materialization for use. (4) There is greater efficiency in determining the materializations to recommend, since the query optimizer need only be invoked once to determine the best materializations for a given query. An external tool, on the other hand, must iteratively recommend and create candidate materializations and invoke the query optimizer to assess that set of materializations.

In one aspect, the present invention provides a method for determining optimal materializations for a query optimizer in a database management system, wherein the query optimizer generates one or more query execution plans in response to a query input from a user for accessing data in a database schema in the database management system, the method comprises the steps of: (a) generating a plurality of temporary materializations as candidates for the query execution plans associated with the query; (b) computing estimated statistics for selected performance parameters for each of the temporary materializations; (c) utilizing the query optimizer to optimize each of the query execution plans; (d) determining if any of the temporary materializations are being utilized in any of the query execution plans; (e) if any of the temporary materializations are being utilized in any of the query execution plane, recommending the temporary materializations to the user together with the associated query execution plans.

In another aspect, the present invention provides a relational database management system for use with a computer system wherein queries are entered by a user for retrieving data from a database schema, the relational database management system includes a query optimizer for optimizing query execution plans associated with the queries entered by the user, the system comprises: (a) means for processing queries; (b) means for generating a plurality of temporary materializations as candidates for the query execution plans associated with the query; (c) means for computing estimated statistics for selected performance parameters for each of the temporary materializations; (d) the query optimizer including means for optimizing each of the query execution plans and means for selecting query execution plans on the basis of selected performance parameters; (e) means for determining if any temporary materializations are being utilized in any of the query execution plans; (f) means for recommending the temporary materializations to the user together with the associated query execution plans selected by the query optimizer if any of the temporary materializations are being utilized in one of the query execution plans.

In yet another aspect, the present invention provides a computer program product for use on a computer wherein queries are entered by a user for retrieving data from a relational database management system having a query optimizer for optimizing query execution plans associated with the queries entered by the user, the computer program product comprises: a recording medium; means recorded on the medium for instructing the computer to perform the steps of, (a) generating a plurality of temporary materializations as candidates for the query execution plans associated with the query; (b) computing estimated statistics for selected performance parameters for each of the temporary materializations; (c) utilizing the query optimizer to optimize each of the query execution plans; (d) determining if any of the temporary materializations are being utilized in any of the query execution plans; (e) if any of the temporary materializations are being utilized in any of the query execution plans, recommending the temporary materializations to the user together with the associated query execution plans.

BRIEF DESCRIPTION OF THE DRAWINGS

Reference will now be made to the accompanying drawings which show, by way of example, preferred embodiments of the present invention, and in which.

DETAILED DESCRIPTION OF THE PREFERRED EMBODIMENT

Figure 1:
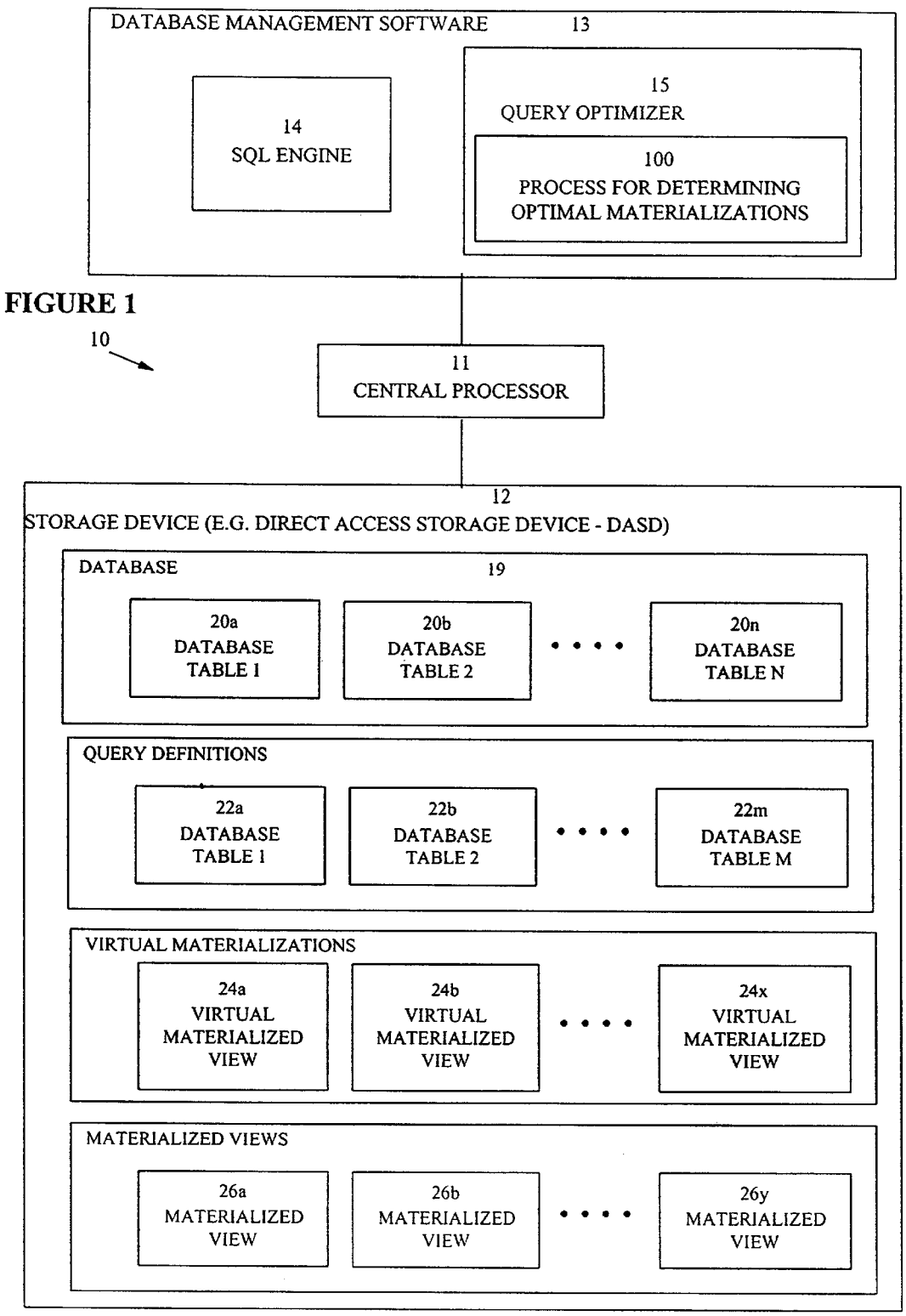
FIG. 1 shows in diagrammatic form a database management system incorporating a method or process according to the present invention for determining optimal database materializations using a query optimizer.
Figure 2:
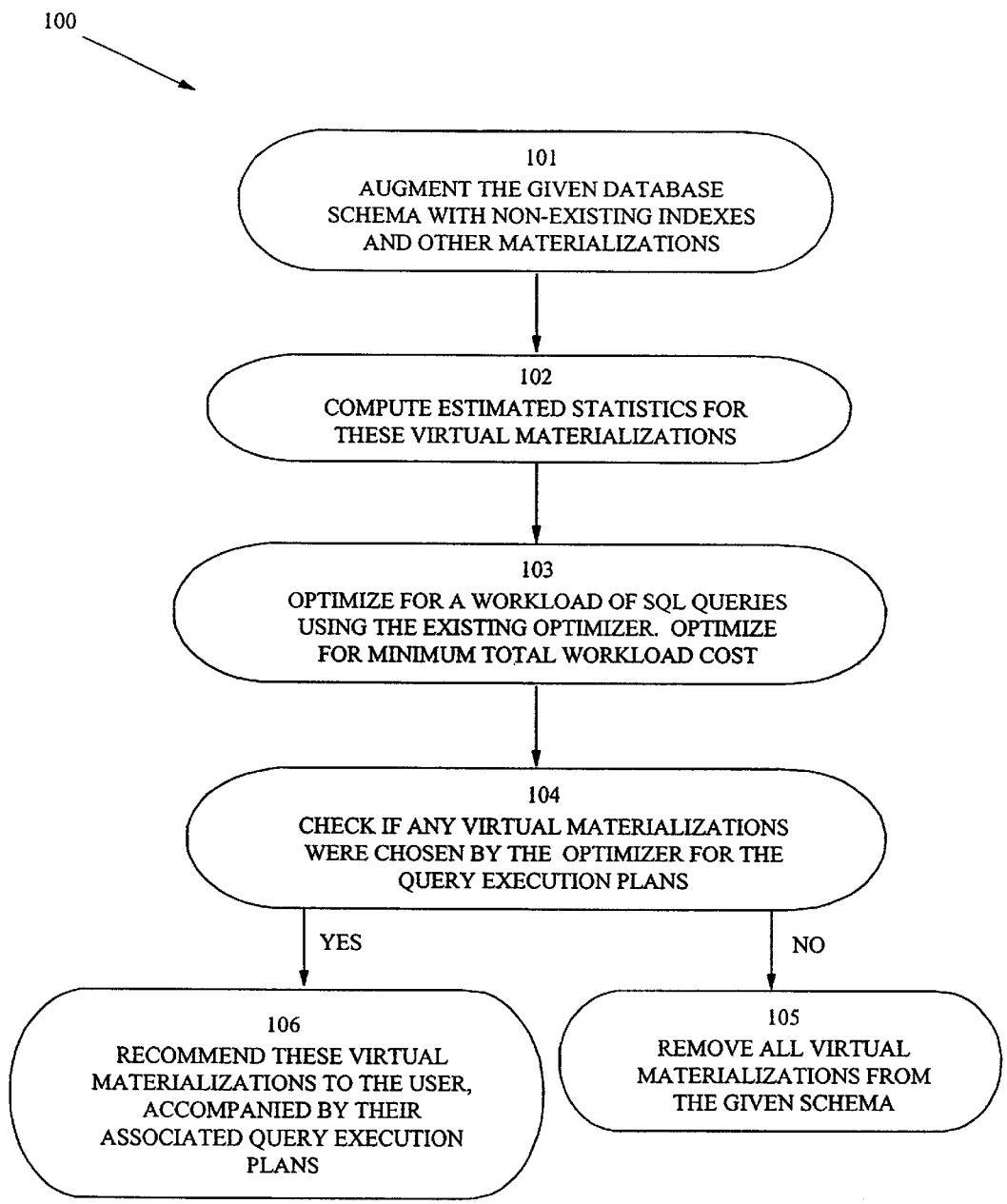
FIG. 2 is a flow chart showing a method according to the present invention for determining optimal database materializations using a query optimizer.

Reference is first made to FIG. 1, which shows in schematic form a database management system 10 incorporating a method or process 100 according to the present invention for determining optimal database materializations using a query optimizer 15. The processing steps embodied in the method for determining optimal database materializations are shown in FIG. 2 as will be described below.

As shown in FIG. 1, the database management system (DBMS) 10 comprises the combination of an appropriate central processing unit 11 (i.e. a computer), direct access storage devices (DASD) or disk drives 12, and database management software 13. A relational database management system 10 is a DBMS which uses relational techniques for storing and retrieving information. The relational database management system or RDBMS 10 comprises computerized information storage and retrieval systems in which data is stored on the DASD 12 or disk drives for semi-permanent storage. The data is stored in the form of a database schema or schema 19 which comprises one or more tables 20, shown individually as 20a, 20b, . . .20n. Each table 20 comprises rows and columns, with each row or tuple having one or more columns.

As shown in FIG. 1, the database management software 13 includes an SQL engine 14 and a query optimizer denoted generally by 15. The SQL engine 14 is a software module which performs the operations specified by the queries. An SQL statement that performs an operation on a database is termed a query. The query optimizer 15 uses conventional techniques to evaluate the most cost-effective way (i.e.

query execution plan) for retrieving data from the database schema 19 in response to the user's query and in accordance with the present invention, the query optimizer 15 incorporates a method or process 100 for determining optimal database materializations. The SQL engine 14 together with the query optimizer 15 perform the operations specified by the queries and generate virtual materializations 24 and materialized views 26 which are stored in the storage media 12. In the context of the present invention, a virtual materialization 24 is a compilation of information which is generated by the method 100 according to the present invention as will be described below. A materialized view 26 is also a compilation of information, similar in structure to a table, and is the result of query which has been optimized according to the present invention. The materialized views 26 are stored in the storage media 12 and in known manner are usable as an input to a query to the database management system 10 DBMS or RDBMS.

The query definitions are stored on the storage media 12 and comprise one or more queries 22 shown individually as 22a, 22b, . . . 22m. Each query 22 specifies a series of operations that are to be performed on one or more of the tables 20 in the database. The queries 22 are typically written in SQL. The virtual materialized views 24 comprise one or more virtual materialized views, shown individually as 24a, 24b, . . . 24x, which are generated by the method 100 in response to the queries. The materialized views 26, shown individually as 26a, 26b, . . . 26y, each comprise a compilation of information, and stored in the storage media 12. As will be described in more detail below, the materialized views 26 are derived from the virtual materializations 24, and a subsequent query is executed with one or more of the materialized views 26, or on a combination of materialized views 26 and tables 20.

As will now be described, the method according to the present invention provides a mechanism for extending the query optimizer 15 to recommend beneficial materializations 26 of data based upon the cost equations already defined for a query optimizers, This is achieved by generating virtual materializations 24 and using the existing cost estimation equations in the query optimizer 15 to assess the cost and benefits of multiple, alternative materializations. Referring to FIG. 2, the method 100 according to the present invention comprises the following processing steps.

The first processing step denoted by 101 is conducted before a query optimization is performed for a given query to the database 19. The first processing step 101 comprises generating one or more virtual materializations 24 (FIG. 1) which might benefit the execution of the particular query as will now be described with reference to the following three examples.

In Example 1, virtual materializations are generated for all possible indexes which may be used to access data from the database, e.g. in response to a INDEX SCAN SQL command in the user's query.

Example #1
Exhaustive Enumeration of All Possible Indexes
For each table T in the schema
 For each combination C of the columns in table T
  Generate a new virtual index on table T corresponding to the combination of columns C
In Example 2, virtual materializations are generated for all possible join materializations, e.g. in response to a JOIN SQL command in the user's query.

Example #2
Exhaustive Enumeration of All Possible Join Materializations
For N=2 to n (i.e. number of tables in query)
 For each possible combination C of N tables using all possible tables
  Generate a new virtual materialization corresponding to the join of the tables in combination C
In Example 3, virtual materializations are generated for selected enumerations.

Example #3
Selective Enumeration
 To reduce the search space, a more selective enumeration algorithm is used.
 If the query optimizer knows which are the "interesting columns" and the "interesting orders" and the "interesting bounding predicates" or start/stop keys, then an enumerator generates virtual indexes which contain just the interesting columns and orders or the indexes that would benefit from the bounding predicates or start/stop keys.

The second processing step 102 comprises computing estimated statistics for the virtual materializations 24 generated in step 101, as if the virtual materializations 24 where actual materializations. The estimated statistics are computed using the query optimizer 15 as will be described in more detail below.

The third step 103 in the method 100 comprises optimizing the SQL queries using the query optimizer 15 for the database management system 10. The SQL queries 22 (FIG. 1) are typically optimized in workloads where each workload comprises a group of SQL queries. This step involves using the existing optimization algorithm in the query optimizer 15. It will be appreciated that the query optimizer 15 must be extended so that groups of SQL queries, i.e. workloads, can be optimized instead of only a single query. Such an optimizer 15 is known as a Mass Query Optimizer as will be familiar to those skilled in the art. The optimization algorithm in the query optimizer 15 considers alternative access paths or query execution plans, including the virtual materializations (e.g. indexes), and estimates the cost benefit to query execution of each access path. The query optimizer 15 then picks the "optimal", i.e. least cost plan, including in that consideration all "virtual" materializations 24, as well as the actual materialized views 26.

Figure 3:
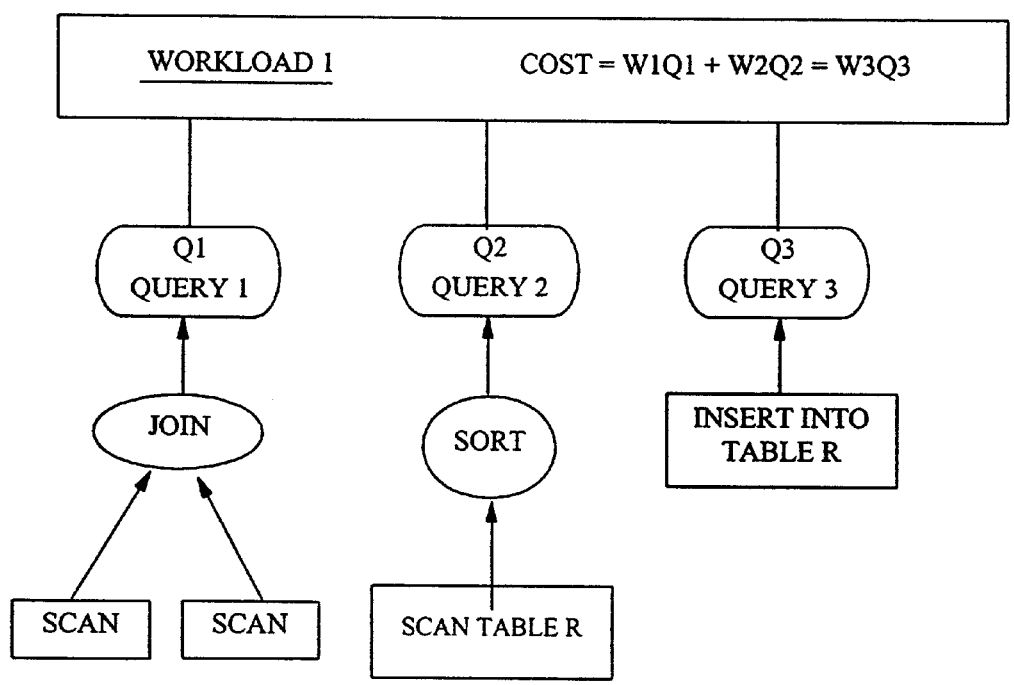
FIG. 3 shows in schematic form an example executed according to the method of FIG. 1.

Reference is made to FIG. 3, which shows the optimization of an exemplary workload, WORKLOAD 1. The cost of WORKLOAD1 is equal to the sum of the cost of each query, Q1, Q2 and Q3, multiplied by their associated weights, W1, W2 and W3, respectively. The weights W1, W2, W3 are typically the expected frequency of each query Q1, Q2, Q3. In this example, a virtual materialization 24 for a new index to Table R has been generated according to the first step 101 of the method 100 (FIG. 2) The workload optimizer 15 optimizes for minimum overall cost of the complete workload, in order to evaluate the usefulness of any virtual materialization 24 and materialized views 26. For example, the new index on Table R will make Query 2 go faster because the SORT operation is then eliminated for the second query Q2. However, this same index on Table R will slow down performance of the third query Q3 because the insert into Table R will require an update of this new index. As a result, the optimizer 15 chooses whether the virtual materialization 24 for the index is cost-effective based on the weights associated with the second query Q2 and the third query Q3.

If the "optimal" plan utilizes any "virtual" materializations, then the plan cannot be executed until those materializations are actually created, i.e. converted into corresponding materialized views 26. The virtual materializations can be used to recommend to the user that they be created, or can be used to automatically materialize the recommended materializations. Accordingly, the next step 104 in the method 100 as shown In FIG. 2 comprises determining if any virtual materializationa 24 were selected by the query optimizer 15 for the query execution plans. If the query optimizer 15 did not select any of the virtual materializations 24, then the virtual materializations 24 are removed from the storage media 12 (FIG. 1) as shown in step 105 in FIG. 2. On the other hand, if the query optimizer 15 has selected a query execution plan which incorporates one or more of the virtual materializations 24, then the virtual materializations 24 are recommended to the user together with the associated query execution plan as shown in step 106 in FIG. 2. For the example shown in FIG. 3, the execution plan for the second query Q2 utilizes a virtual materialization for the index to Table R.

As described above, step 103 of the method 100 includes the process of optimizing for minimum total workload cost. The process of optimizing utilizes the virtual materializations 24 (FIG. 1) which were generated in step 101 and may be further refined as follows:

(1) The existing optimization algorithm in the query optimizer 15 applies conventional techniques in the consideration of alternative access paths or query execution plans, including indexes, and estimates the respective cost-benefit of each access path to query execution, and picks the "optimal", i.e. least cost, access path or query execution plan. In the evaluation of the alternative access paths or query execution plans, the optimization algorithm considers all the virtual materializations 24 as well as the actual materialized views 26.

(2) The existing optimization algorithm applies conventional techniques in the consideration of alternative access paths or query execution plans, including indexes, and estimates the respective cost-benefit of each access path to query execution, and picks the "optimal" or least cost access path or query execution plan. In the evaluation, the optimization algorithm only considers the actual materialized views 26.

The estimated benefit of the virtual materializations 24 is given as the difference in cost of the access plan chosen by the optimizer in (1) as described above and the access plan chosen by the optimizer in (2) as also described above.

A feature of the present invention is that the method is incorporated into the query optimizer, rather than as an external tool. This arrangement provides the following advantages:

(1) The existing infrastructure for iterating through alternative access paths to a table, and for estimating execution costs of these alternatives, can be exploited, and does not have to be replicated in an external tool.

(2) Maintenance costs decrease because the equations used to estimate costs and benefits need be maintained in only one place, i.e. in the query optimizer.

(3) There is greater accuracy in cost estimation, since there is no possibility of the query optimizer and an external tool being out of synchronization. The user is also guaranteed that the query optimizer will use the recommended materialization if it is defined, since the query optimizer recommended the materialization by using its equations to pick that materialization for use.

(4) There is greater efficiency in determining the materializations to recommend, since the query optimizer need only be invoked once to determine the best materializations for a given query. An external tool, on the other hand, must iteratively recommend and create candidate materializations and invoke the query optimizer to assess that set of materializations.

As described it is a principal feature of the present invention that the method for determining optimal database materializations utilizes the existing query optimizer 15 in the database management system 10 (FIG. 1). An implementation of a function for generating a virtual materialization of an index using the existing query optimizer 15 may take the following form:

```
// within the context of the optimizer, this function is used to
   generate a subplan which is a scan of table T1
1: function access_table(T1)
   {
2: generate_table_scan plans(T1);
3: generate_virtual_indexes(T1);
4: generate—index_scan_plans(T1);
5: add_new_subplans_to_list ();
   }
6: function generate_virtual_indexes(T1)
   {
7: variable COLUMN_SET;
8: loop (COLUMN_SET=all combinations of column orders)
   {
9: variable INDEX;
10: INDEX=add_virtual_index(TI,COLUMN_SET);
11: generate_statistics(INDEX);
   {
   }
   }
```

The function for generating a virtual materialization of an index comprises a function access_table(T1) (line 1) and a function generate_virtual_indexes(T1) (line 6).

Referring to the pseudo-code listing above, the access_table(T1) function comprises a function generate_table_scan_plans (TI) (line 2), a function generate_virtual_indexes(T1) (line 3), a function generate_index_scan_plans(T1) (line 4) and a function add_new_subplans_to_list (). The function access. table(T1) comprises a known function in the query optimizer is and as will be familiar to one skilled in the art the function is called when the query optimizer 15 needs to make a list of all possible methods of scanning table T1, including index scan. The function generate_table_scan plans(T1) also comprises a known function in the query optimizer 15 which generates methods for scanning the table T1 without using its indexes, and proposes a subplan in each case as will understood by one skilled in the art. The function generate_virtual_indexes (T1) is a new function implemented in the query optimizer 15 which is used to add virtual indexes to the array of available indexes on table T1. The function generate_index_scan plans(T1) is a known function in the query optimizer 15 which looks at the list of indexes (existing and virtual) on table T1, checks which indexes can be used to satisfy the query, and proposes a subplan in each case. The function add_new_subplans_to_list() also comprises a known function in the query optimizer 15 which takes the valid subplans and adds them to the list of all available subplans. The specific implementation aspects of these functions in accordance with the present invention are within the understanding of one skilled in the art.

The function generate_virtual_indexes(T1) comprises an iterative loop (line 8) which is executed for all combinations of column orders as defined by a variable COLUMN_SET (line 7). In the loop, a variable INDEX (line 9) is updated by a function add_virtual_index (line 10) and then cost-benefit statistics are generated by a function generate_statistics (line 11) for each INDEX (i.e. virtual materialization). The function add_virtual_index (T1, COLUMN_SET) is a new function implemented in the query optimizer 15 which effectively adds a new entry in the list of table T1 indexes, and marks each of these new entries as "virtual". The function generate_statistics (INDEX) is a new function implemented in the query optimizer 15 which estimates statistics for the new INDEX, and places these statistics together with the associated INDEX. These statistics are used by the query optimizer 15 for costing, and they may be derived from the table statistics of table T1 and the subset of columns that appear in this INDEX. The specific implementation aspects of these functions in accordance with the present invention are within the understanding of one skilled in the art.

An implementation of a function for generating a virtual materialization of a JOIN using the existing query optimizer 15 in the database management system 10 of FIG. 1 may take the following form;
// within the context of the optimizer, this function is used to generate a subplan which joins two existing subplans SP1 and SP2
1: function access_join(SP1,SP2)
{
2: variable MATERIALIZED_JOIN;
3: MATERIALIZED_JOIN=generate_virtual_materialized_Join(SP1,SP2)
4: generate_join subplans (SP1,SP2);
5: generate_table_subplans (MATERIALIZED_JOIN);
6: add_new_subplans_to_list ();
}

The function is defined as access_join(SP1, SP2) in line 1. The access_join function includes a function generate_virtual_materialized_join (line 3), a function generate_join_subplans (SP1, SP2), a function generate_table_subplans (MATERIALIZED_JOIN) (line 5), and a function add_new_subplans_to_list () (line 6). The function access_join (SP1, Sf2) is a known function in the query optimizer 15 which as will be familiar to one skilled in the art is called when the query optimizer 15 needs new subplans which represent the joining of old subplans SP1 and SP2. The function access_join(SP1, SP2) includes another known query optimizer function, generate_join_subplans (SP1, SP2). The function generate_join_subplans(SP1, SP2) as will be familiar to one skilled in the art is used to generate subplans which execute the join of SP1 and SP2 using available join techniques, e.g. nested-loop join, sort-merge join, hash join. The function access_join (SP1, SP2) also includes another known query optimizer function, generate_table_subplans (MATERIALIZED_JOINS) which as will be familiar to one skilled in the art checks if there are any MATERIALIZED_JOINS that can satisfy the requirements of joining SP1 and SP2. The function generate_virtual_materialized_join (SP1, SP2) is a new function implemented in the query optimizer 15 which generates virtual materializations of the effective result of joining the tables in SP1 with the tables in SP2, and adds these materializations, along with the associated statistics, to the list of available materializations, and these new materializations are marked as "virtual". The specific implementation aspects of these functions in accordance with the present invention are within the understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein

What is claimed is:

1. A method for determining optimal materializations for a query optimizer in a database management system, wherein the query optimizer generates one or more query execution plans in response to a query input from a user for accessing data in a database schema in the database management system, said method comprising the steps of:

(a) generating a plurality of temporary materializations as candidates for the query execution plans associated with the query;

(b) computing estimated statistics for selected performance parameters for each of said temporary materializations;

(c) utilizing the query optimizer to optimize each of the query execution plans;

(d) determining if any of said temporary materializations are being utilized in any of the query execution plans;

(e) if any of said temporary materializations are being utilized in any of the query execution plans, recommending said temporary materializations to the user together with the associated query execution plans.

2. The method as claimed in claim 1, further including the step of deleting said temporary materializations not being utilized in any of the query execution plans.

3. The method as claimed in claim 1, further including the step of converting said recommended temporary materializations into actual materializations.

4. The method as claimed in claim 1, wherein said step of generating a plurality of temporary materializations for the query comprises generating a temporary materialization for an index which becomes a candidate for the query execution plans.

5. The method as claimed in claim 1, wherein said step of generating a plurality of temporary materializations for the query comprises generating a temporary materialization for a join index which becomes a candidate for the query execution plans.

6. The method as claimed in claim 1, wherein said step of generating a plurality of temporary materializations for the query comprises generating a temporary materialization for columns and orders of interest which becomes a candidate for the query execution plans.

7. A relational database management system for use with a computer system wherein queries are entered by a user for retrieving data from a database schema, the relational database management system including a query optimizer for optimizing query execution plans associated with the queries entered by the user, said relational database management system comprising:

(a) means for processing queries;

(b) means for generating a plurality of temporary materializations as candidates for the query execution plans associated with the query;

(c) means for computing estimated statistics for selected performance parameters for each of said temporary materializations;

(d) the query optimizer including means for optimizing each of the query execution plans and means for selecting query execution plans on the basis of selected performance parameters;

(e) means for determining if any of said temporary materializations are being utilized in any of the query execution plans;

(f) means for recommending said temporary materializations to the user together with the associated query execution plans selected by the query optimizer if any of said temporary materializations are being utilized in any of the query execution plans.

8. The relational database management system as claimed in claim 7, further including means for deleting temporary materializations not being utilized in any of the query execution plans.

9. The relational database management system as claimed in claim 8, including means for converting said recommended temporary materializations into actual materializations.

10. A computer program product for use on a computer wherein queries are entered by a user for retrieving data from a relational database management system having a query optimizer for optimizing query execution plans associated with the queries entered by the user, said computer program product comprising:

a recording medium;

means recorded on said medium for instructing said computer to perform the steps of, (a) generating, a plurality of temporary materializations as candidates for the query execution plans associated with the query;

(b) computing estimated statistics for selected performance parameters for each of said temporary materializations;

(c) utilizing the query optimizer to optimize each of the query execution plans;

(d) determining if any of said temporary materializations are being utilized in any of the query execution plans;

(e) if any of said temporary materializations are being utilized in any of the query execution plans, recommending the temporary materializations to the user together with the associated query execution plans.

11. Data storage media recorded with a computer program which, in combination with a general purpose computer configured for a database management system and equipped to read into memory and execute program data from the data storage media, constituting a method in accordance with claim 1.

* * * * *